(No Model.)
C. R. DAVIS.
HARROW
No. 418,452. Patented Dec. 31, 1889.
Fig. 1.
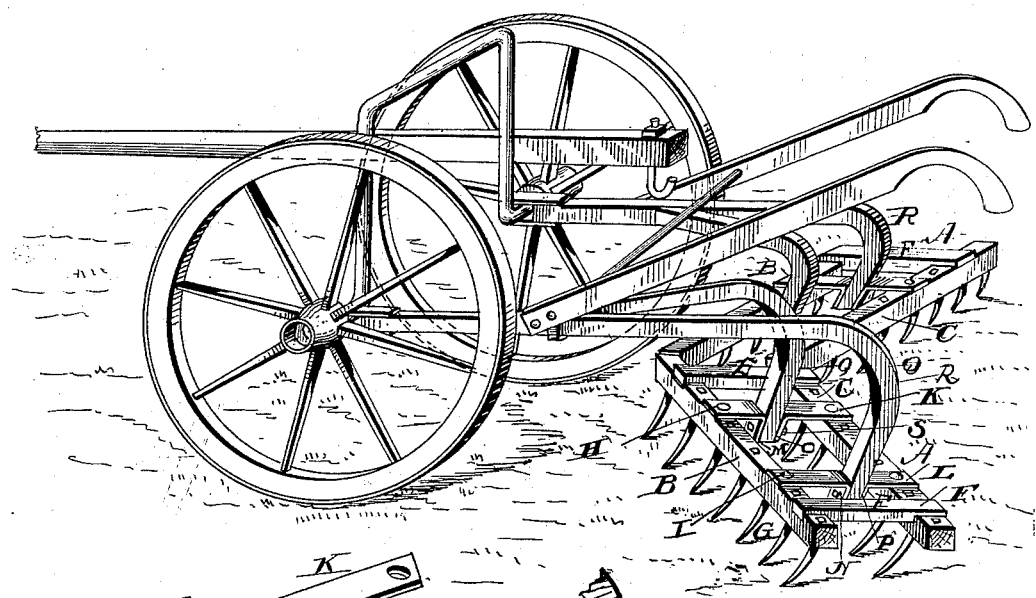
Fig. 2.
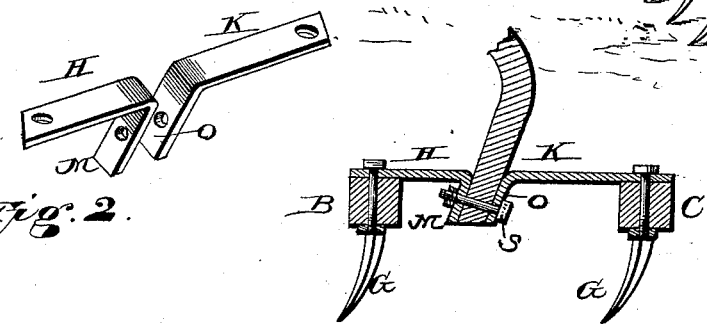
Fig. 3.
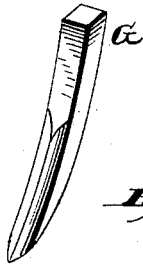
Fig. 4.
WITNESSES:
F. L. Durand
C. F. Chisholm
INVENTOR:
Charles R. Davis
by James Dagger & Co.
Attorneys

UNITED STATES PATENT OFFICE.

CHARLES R. DAVIS, OF RAYMOND, ILLINOIS.

HARROW.

SPECIFICATION forming part of Letters Patent No. 418,452, dated December 31, 1889.

Application filed August 15, 1889. Serial No. 320,866. (No model.)

*To all whom it may concern:*

Be it known that I, CHARLES R. DAVIS, a citizen of the United States, and a resident of Raymond, in the county of Montgomery and State of Illinois, have invented certain new and useful Improvements in Harrows; and I do hereby declare that the following is a full, clear, and exact description of the invention, which will enable others skilled in the art to which it appertains to make and use the same.

My invention relates to harrows, and has for its object to construct a simple, light, and effective harrow adapted to be attached to the plow-arms of a cultivator. I accomplish this object by the contrivance illustrated in the accompanying drawings, in which—

Figure 1 is a perspective view of a cultivator with my harrow attached. Fig. 2 is a detail view of the cross attachments shown in Fig. 1. Fig. 3 is a longitudinal sectional view of the same; and Fig. 4 is a detail view of one of the teeth, as shown in Fig. 1.

Like letters of reference denote corresponding parts in all the figures.

The harrow is composed of two symmetrical sections A, each of which is made in the form of a rhomboid or parallelogram having two acute and two obtuse angles. The beams B and C and the braces E and F may be either of wood or of iron. The teeth G may be of any desired shape, and are arranged in the frame in such a manner that as the harrow moves forward no two teeth will follow in the same line. Attached to the front beams B are two bars H I, extending backward, and to the rear beams C are attached two corresponding bars K L, extending toward the front. The front bars H I are bent at an acute angle, forming the downward projections M N, and the corresponding bars K L, attached to the rear beams C, have downward projections O P, which form obtuse angles with the horizontal portions of said bars. Between the projections M N and the corresponding projections O P are inserted the arms Q R of a cultivator, the plows having been detached. These arms Q R being firmly fastened by bolts S, passing through them and through the projections M N and O P, respectively, the harrow is ready for operation.

It will be seen that to detach the plows from a cultivator and to attach my harrow is but the work of a few minutes, and that thereby all the frame-work and attachments of the cultivator are made to serve a double purpose and a great saving of expense accomplished.

When the arms Q R are bolted to the bars H I and K L, respectively, the bars and arms form cross attachments which act as extra braces. The bars H I and K L may be readily moved along the beams B C to adjust them to the varying distances by which the cultivator-arms Q R are separated from each other. It may be desirable to attach the two wings of the harrow together by hinges attached to the beams B B C C; but whether attached or allowed to remain independent the two parts, being light and having ready play, will adapt themselves easily to irregular and uneven ground.

Having thus described my invention, I claim and desire to secure by Letters Patent of the United States—

The combination, with a harrow constructed substantially as described, of the adjustable bars H I K L, bent downwardly at their inner ends to adapt them to be attached to opposite sides of the lower ends of the cultivator arms or standards, substantially as set forth.

In testimony that I claim the foregoing as my own I have hereunto affixed my signature in presence of two witnesses.

CHARLES R. DAVIS.

Witnesses;
HARMON STEEGE,
LEM L. POTTS.